United States Patent [19]

Meisner et al.

[11] Patent Number: 4,505,644

[45] Date of Patent: Mar. 19, 1985

[54] LINEAR INDUCTION PUMP

[75] Inventors: John W. Meisner, Newbury Park; Robert M. Moore, Canoga Park; Louis L. Bienvenue, Chatsworth, all of Calif.

[73] Assignee: The United States of America as represented by the United States Department of Energy, Washington, D.C.

[21] Appl. No.: 447,081

[22] Filed: Dec. 6, 1982

[51] Int. Cl.³ .......................................... H02K 44/06
[52] U.S. Cl. .................................................... 417/50
[58] Field of Search ............................. 417/50; 310/11

[56] References Cited

U.S. PATENT DOCUMENTS

| | | | |
|---|---|---|---|
| 2,386,369 | 10/1945 | Thompson | 417/50 |
| 2,686,474 | 8/1954 | Pulley | 417/50 |
| 2,798,434 | 7/1957 | Brill et al. | 417/50 |
| 2,985,106 | 5/1961 | Rhudy | 417/50 |
| 3,115,837 | 12/1963 | Campana | 310/11 X |
| 3,179,824 | 4/1965 | Stuetzer | 310/11 |
| 3,263,283 | 8/1966 | Allard | 417/50 |
| 3,288,069 | 11/1966 | Michaux | 417/50 |
| 3,444,816 | 5/1969 | King | 417/50 |
| 3,453,459 | 7/1969 | Weh | 310/11 |
| 3,567,339 | 3/1971 | Paine | 417/50 |
| 4,392,786 | 7/1983 | Merenkov et al. | 417/50 |

Primary Examiner—Edward K. Look
Assistant Examiner—Pawl F. Neils

[57] ABSTRACT

Electromagnetic linear induction pump for liquid metal which includes a unitary pump duct. The duct comprises two substantially flat parallel spaced-apart wall members, one being located above the other and two parallel opposing side members interconnecting the wall members. Located within the duct are a plurality of web members interconnecting the wall members and extending parallel to the side members whereby the wall members, side members and web members define a plurality of fluid passageways, each of the fluid passageways having substantially the same cross-sectional flow area. Attached to an outer surface of each side member is an electrically conductive end bar for the passage of an induced current therethrough. A multi-phase, electrical stator is located adjacent each of the wall members. The duct, stators, and end bars are enclosed in a housing which is provided with an inlet and outlet in fluid communication with opposite ends of the fluid passageways in the pump duct. In accordance with a preferred embodiment, the inlet and outlet includes a transition means which provides for a transition from a round cross-sectional flow path to a substantially rectangular cross-sectional flow path defined by the pump duct.

8 Claims, 5 Drawing Figures

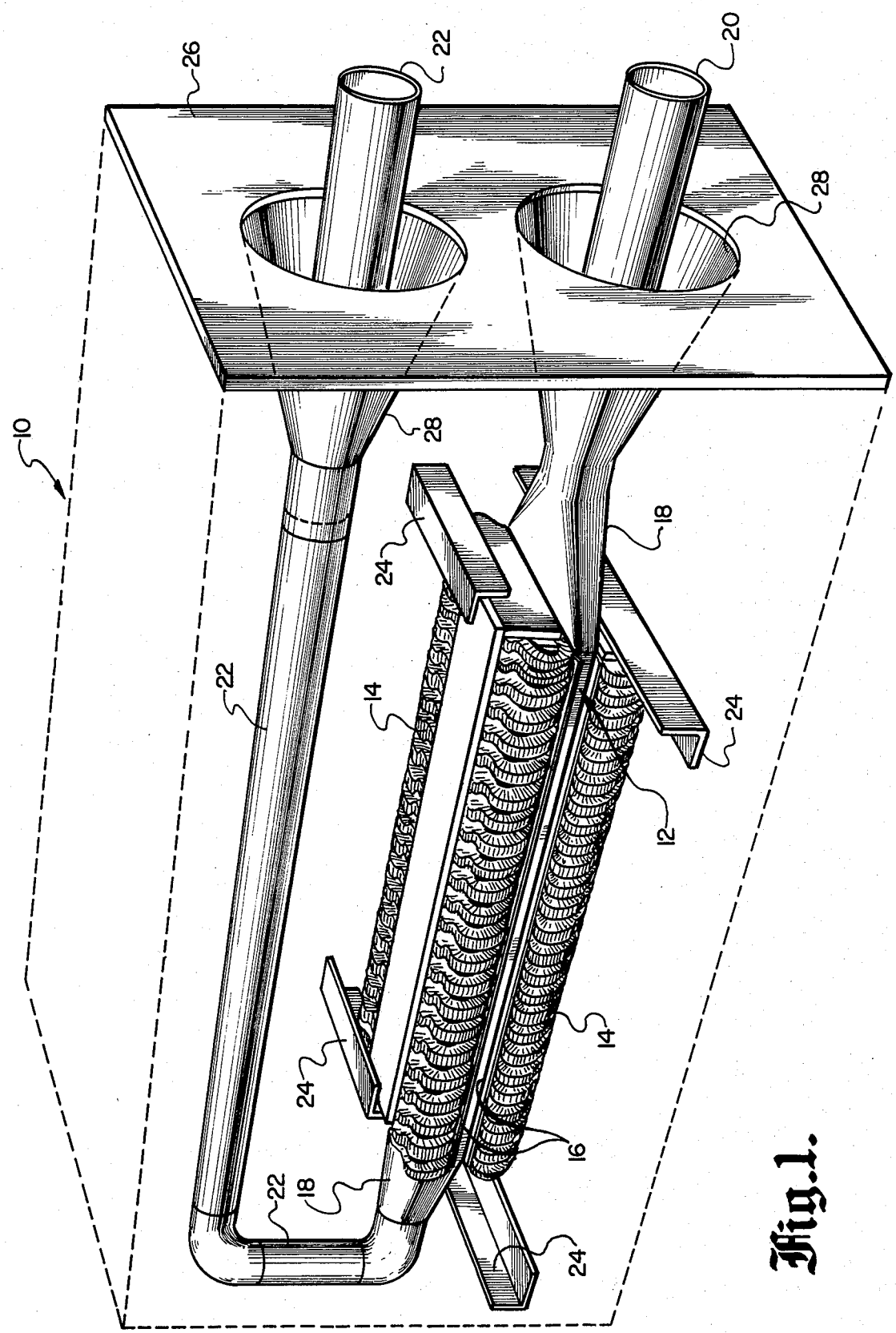

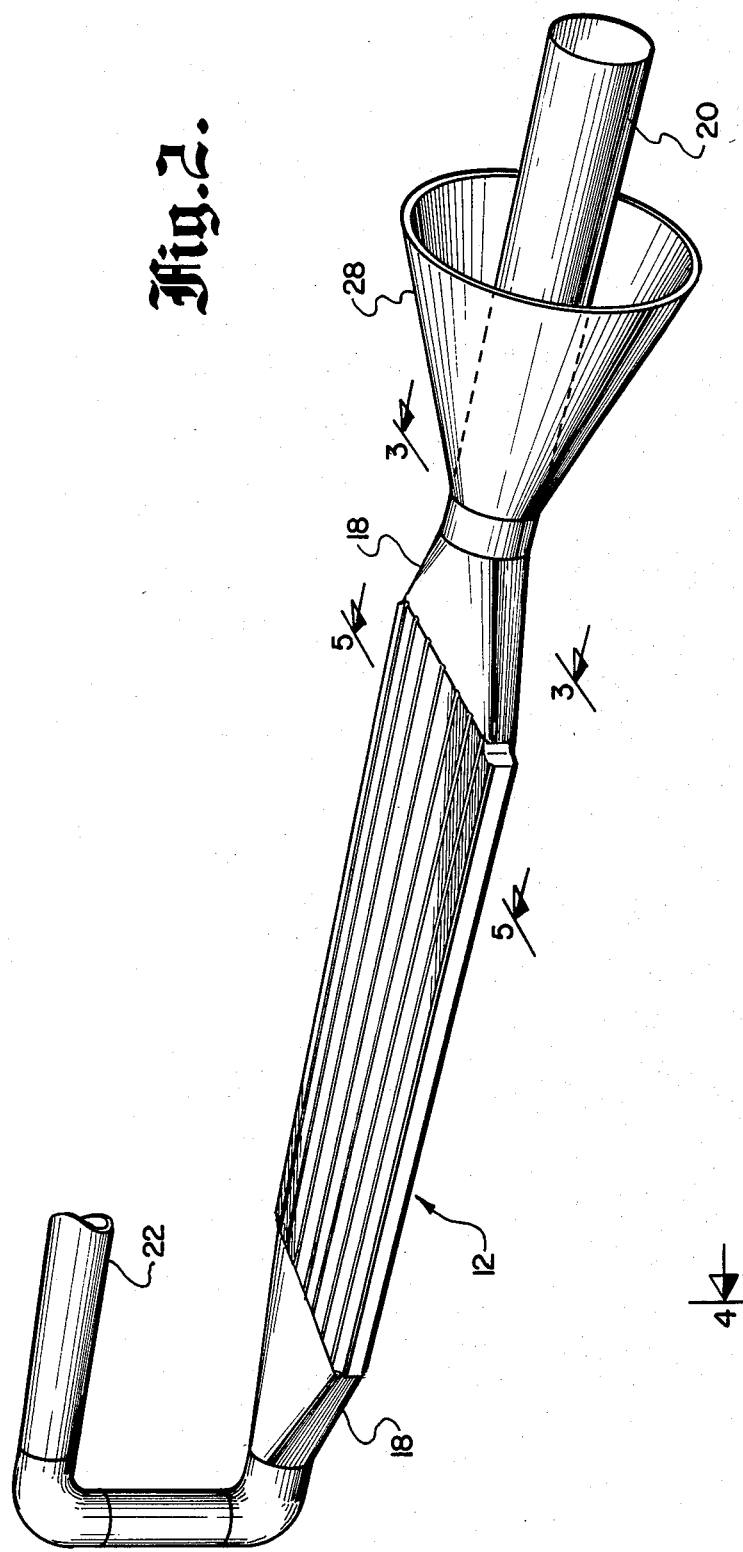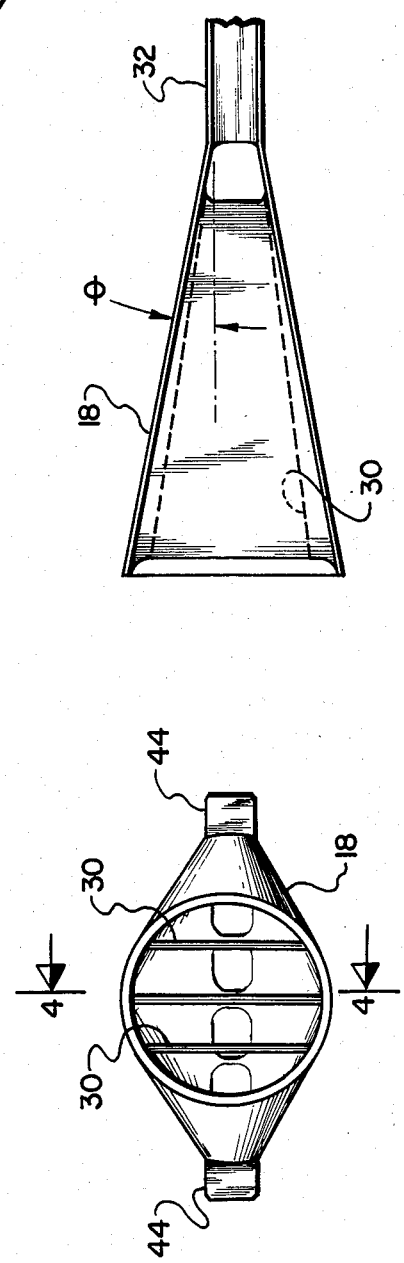

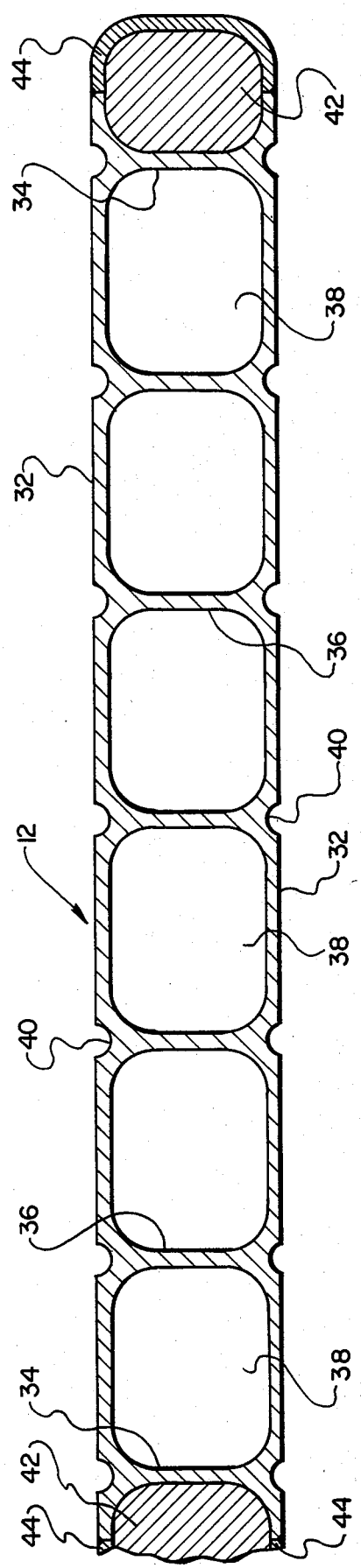

LINEAR INDUCTION PUMP

CONTRACTUAL ORIGIN OF THE INVENTION

The invention described herein was made in the course of, or under, a subcontract under a contract with the U.S. Department of Energy.

BACKGROUND OF THE INVENTION

The present invention broadly relates to pumps and, more particularly, to electromagnetic pumps for causing the movement of fluids that are electrically conductive.

It is frequently necessary or desirable to pump liquids that are either corrosive, should not be subjected to violent agitation, or tend to seep through small openings or cracks, or which, because of their chemical properties, should be kept completely enclosed and isolated from the atmosphere. This is particularly true in the case of pumps used for such liquid metals as sodium and sodium-potassium eutectic which are used as coolants in nuclear reactors.

In cases such as those above, mechanical pumps are generally unsatisfactory because of the requirements for moving blades or vanes and their associated bearings. These moving parts impose limitations on the types of materials which can be used, as well as the need for seals which ordinarily must not leak or permit the entrance of air. These considerations have led to the development of the so-called "electromagnetic" pump. This type of pump solves most of the problems associated with mechanical pumps when used to pump electrically conductive liquids such as mercury, sodium, potassium, or the like. However, such pumps have one serious drawback; namely, they are relatively inefficient. Indeed, efficiencies as low as 20% are not uncommon.

A typical example of a prior art conduction type of electromagnetic pump is found in U.S. Pat. No. 2,386,369. This patent describes a pump in which mercury is caused to flow along a channel by the reaction between an electric current passing through the mercury having a component perpendicular to the direction of flow of the mercury and a magnetic field having a component perpendicular both to the electric current and to the direction of flow. The pump duct is composed of dissimilar metals.

Another conduction type of electromagnetic pump is described in U.S. Pat. No. 2,686,474. This patent describes an electromagnetic pump for electrically conducting fluids such as liquid metals wherein the fluid is caused to flow along a duct in a gap in an iron circuit due to the interaction of mutually perpendicular components of flux or current in the field. This patent discusses improving the maximum pressure and efficiency of conduction-type pumps. The manner in which it is proposed such improvements be made is by looping the pump duct back through the air gap to reduce the distortion of the primary magnetic field due to the duct current.

Another linear conduction type of electromagnetic pump is described in U.S. Pat. No. 2,798,434. In accordance with the invention described therein, it is proposed that the distribution of the field flux in the pump throat may be made uniform and uniformly distributed by conducting the throat current across the top or bottom of the pump throat in a direction opposite the direction of the current through the fluid in the throat.

U.S. Pat. No. 3,263,283 relates to a continuous casting process and apparatus. The apparatus utilizes a multiphase linear induction type of electromagnetic pump. This reference, however, does not suggest any means for improving the efficiency of such a pump.

U.S. Pat. No. 3,444,816 describes a conduction type of electromagnetic pump which is capable of pumping conductive liquid at a relatively high pressure and low flow rate. The pump described produces a magnetic field in a first direction across a gap filled with electrically conductive liquid. The pump also has electrodes which cause electric current to flow through the liquid in the gap at right angles to the direction of the magnetic field to cause pressure and flow of the liquid in a direction normal to both the magnetic and electric fields. Through the use of a narrow gap in the direction of the magnetic field, a high magnetic field strength is accomplished with magnets or magnetic coils of reasonable size. This produces a liquid space which is of small cross-sectional area in the direction perpendicular to current flow to produce a relatively high electrical resistance in the liquid such that the pump employs a relatively low electric current to produce a high fluid head.

SUMMARY OF THE INVENTION

The present invention provides an electromagnetic pump of the linear induction type for pumping electrically conductive liquid metals. A key feature of the present invention is the unitary pump duct which provides a pump of substantially increased efficiency. The pump duct comprises two substantially flat parallel spaced-apart wall members located one above the other and two parallel opposing side members interconnecting the wall members. The duct further includes a plurality of web members located within the duct and interconnecting the wall members and extending parallel to the side members. The side members, wall members and web members define a plurality of fluid passageways for the flow of liquid metal therethrough. Each of the fluid passageways has substantially the same cross-sectional flow area. A multi-phase electrical stator is located adjacent each of the wall members for the generation of an electromagnetic field. Attached to each of the side members is an electrically conductive end bar, to provide a return path for the induced currents which flow through the duct member. The pump further includes a housing which encloses the pump duct, stators and end bars. The housing includes an inlet, an outlet in fluid communication with opposite ends of the fluid passageways in the pump duct. In accordance with one preferred aspect of the invention, the web members in the pump duct are located such that the fluid passageways are substantially square. In accordance with another preferred aspect of the invention, the inlet and outlet include a transition means for providing a transition from a round cross-sectional flow path to the substantially rectangular cross-sectional flow path defined by the pump duct.

These and other aspects and advantages of the present invention will be more apparent upon reading the following description together with the drawings.

BRIEF DESCRIPTION OF THE DRAWINGS

FIG. 1 is an isometric view, partially in phantom and partially cut away, showing a linear induction pump constructed in accordance with the present invention.

FIG. 2 is an enlarged view of the pump duct and fluid connections.

FIG. 3 is a sectional view of the transition member shown in FIG. 2 taken at cutting plane 3—3.

FIG. 4 is a cross-sectional view of the transition member shown in FIG. 3 taken at cutting plane 4—4.

FIG. 5 is a cross-sectional end view of the pump duct shown in FIG. 2 taken at cutting plane 5—5.

DETAILED DESCRIPTION OF THE DRAWING

The present invention relates to an electromagnetic pump for electrically conductive fluids such as liquid metals. It is particularly applicable to sodium and sodium-potassium mixtures which are utilized as coolants for nuclear reactors. There are two general types of electromagnetic pumps; namely, conduction pumps and induction pumps. The conduction pump generally has externally connected electrodes for causing electric current to flow through a fluid in a duct, while an induction pump is characterized in that there are no externally connected electrodes, rather the current in the fluid in the duct is induced therein by a changing magnetic flux. The present invention relates to the latter type of pump; namely, a multi-phase linear induction pump.

Referring to FIG. 1, therein is depicted an electromagnetic pump assembly 10 constructed in accordance with the present invention. A key aspect of the present invention is the unique design of pump duct assembly 12 which makes it possible to obtain higher efficiencies than were heretofore possible.

Located on either side of pump duct assembly 12 is a multi-phase electrical stator 14 which comprises a plurality of coils of electrically conductive wire which extend transversely across pump duct assembly 12. These coils lie within slots in a laminated steel core, generally a silicon steel. The entire construction is the same as that of the stator of an asynchronous three-phase motor which has been unrolled from its cylindrical configuration into a flat configuration. The rotating field of such a motor is thus replaced in the magnetic pump by a longitudinally shifting field whose lines of force extend perpendicular to the plane of duct assembly 12, while the field itself shifts in its own plane in a direction parallel to the direction of fluid flow through duct assembly 12. This shifting field induces currents in the conductive liquid metal flowing through duct assembly 12 on which the field exercises forces which drive the metal in the direction in which the field shifts. In an electromagnetic pump the induced currents flowing through the duct material absorb power and do not contribute to the pumping action. Thus, in accordance with the present invention, as will be described in more detail later, pump duct assembly 12 is designed in a manner to minimize such losses.

When pump assembly 10 is to be used for high temperature liquid metals, there advantageously is placed intermediate stators 14 and pump duct assembly 12 a layer of thermal insulation 16. Each end of duct assembly 12 terminates in a transition member 18 which is designed in a manner that will be described later to minimize any hydraulic losses of fluids flowing therethrough. Transition member 18 provides the interface or interconnection between pump duct assembly 12 and fluid inlet and outlet conduits 20 and 22, respectively, which are generally substantially round in cross section. Pump duct assembly 12 and stators 14 are supported by brackets 24. The precise manner in which this support is provided is not shown since such support is well within the skill of one versed in the art. Brackets 24 are attached to a housing 26. Inlet and outlet conduits 20 and 22 are connected to housing 26 via a truncated cone or funnel-shaped member 28, the smaller end being attached to the periphery of the conduits and the larger open end being affixed to corresponding openings in housing 26.

FIG. 2 shows pump duct assembly 12 and transition members 18 without the stators, insulation, etc. for greater clarity and understanding of their arrangement. Referring to FIGS. 3 and 4, it is seen that transition member 18 provides for a transition from the round conduits to the rectangular cross-sectional flow area of pump duct assembly 12. In addition, it will be noted that transition member 18 diverges from a substantially round cross-sectional flow area to a substantially rectangular cross-sectional flow area at an angle $\theta$ which should be about 10 degrees or less to prevent any turbulence caused by fluid separation from the walls. In addition, to further assist in preventing any such fluid separation, transition member 18 is provided with internal guide vanes 30.

Referring now to FIG. 5, therein is depicted a cross-sectional view of pump duct assembly 12. Pump duct assembly 12 comprises two substantially flat, elongated, parallel, spaced-apart wall members 32 and two parallel opposing side members 34 which interconnect wall members 32. In addition, duct assembly 12 further includes a plurality of web members 36 located within duct assembly 12, interconnecting wall members 32 and extending parallel to side members 34 such that the wall members, side members and web members define a plurality of fluid passageways 38 for the passage of liquid metal therethrough. Each of fluid passageways 38 have substantially the same cross-sectional flow area and are substantially square. In accordance with a particularly preferred embodiment, the aforedescribed portion of duct assembly 12 is machined from a single piece of metal to ensure that there is no electrical discontinuity between the wall members, side members and web members.

It will be noted in FIG. 5 that there is provided a plurality of grooves 40 on the outer surfaces of wall members 32 opposite each web member 36. These grooves provide a slight increase in the electrical resistivity of wall members 32 to further reduce the amount of induced currents which would otherwise flow transversely across duct assembly 12 through wall members 32, such that more of the induced current flows through the metal flowing through passageways 38. To further reduce power losses from the flow of induced currents and provide a return path for the induced currents, duct assembly 12 is provided with a pair of highly electrically conductive end bars 42, which generally will be formed from copper in view of its high conductivity and relatively low cost. It will be noted that side members 34 are formed in an outwardly extending U-shape to closely conform to the shape of end bars 42 to ensure good electrical conductivity between side members 32 and end bars 42. Advantageously, end bars 42 are brazed to side members 34 to further enhance the electrical conductivity therebetween. When the pump assembly of the present invention is to be used for high temperature applications it is preferred that end bars 42 be sealed from the atmosphere by covers 44 to prevent any oxidation of the end bars which might decrease their electrical conductivity.

EXAMPLE

A linear induction electromagnetic pump assembly substantially as depicted in the drawings was designed for use with high-temperature liquid sodium. The pump duct assembly was fabricated from a single piece of stainless steel and had overall dimensions of approximately 1 inch in height by 7 inches in width and a length of about 55 inches. The thickness of wall members 32, side members 34, and web members 36 was approximately 0.056 inches. The pump duct assembly contained five web members 36 such that there were six fluid passageways of substantially cross-sectional flow area. A plurality of grooves 40 approximately 0.05 inches wide by 0.05 inches deep were placed on an outer surface of wall members 32 adjacent web members 36 as depicted in FIG. 5. End bars 42 were formed from copper and had cross-sectional dimensions of approximately 0.9 by 0.9 inches and extended substantially the full length of duct assembly 12. End bars 42 were brazed in place and then enclosed with covers 44 to prevent any oxidation of the copper at the elevated temperature intended for operation.

Transition member 18 provided for an even transition from the rectangular cross section of duct assembly 12 (1 inch by 7 inches) to a 4-inch diameter for connection to the inlet and outlet conduit members. Transition member 18 had an overall length of approximately 10 inches such that the walls diverged at an angle of less than 10° to the direction of flow. Transition member 18 further included two guide vanes 30. Each of stators 14 comprised 48 coils wound in a laminated silica steel core, each coil comprising 12 turns of a copper conductor. Thermal insulation was placed between the stators and duct assembly 12.

The pump was connected to a 4-inch sodium test loop and subjected to a series of tests. Excellent results were obtained at all planned sodium temperatures and flow rates, with ample excess capacity being exhibited. The total running time during the testing exceeded 1000 hours, including a 200-hour continuous run at 300 gallons per minute with 900° F. sodium. During these tests, efficiencies as high as 40% were obtained. In addition, it was found that inlet pressures as low as 7.5 to 12 psia were adequate to prevent any cavitation at flows up to 500 gallons per minute. Thus, the test results demonstrated the efficacy and efficiency of the present invention.

The present invention has been described in what is now considered its preferred embodiment. It will be clear, however, that it is susceptible to numerous modifications and embodiments within the ability of those skilled in the art and without the exercise of inventive faculty. Accordingly, the scope of the invention is not to be limited by the specific embodiments described but rather by the scope of the following claims.

What is claimed is:

1. An electromagnetic linear induction pump for liquid metal comprising:
   a unitary pump duct, said duct comprising:
      two substantially flat parallel spaced-apart wall members, said wall members being located one above the other,
      two parallel opposing side members interconnecting said wall members;
   a plurality of web members located within said duct interconnecting said wall members and extending parallel to said side members, and said wall members, side members and web members defining a plurality of substantially square fluid passageways for the flow of liquid metal therethrough, each of said fluid passageways having substantially the same cross-sectional flow area;
   a multi-phase electrical stator located adjacent each of said wall members;
   an electrically conductive end bar attached to an outer surface of each of said side members;
   a housing enclosing said pump duct, stators and end bars, said housing having an inlet and an outlet in fluid communication with opposite ends of the fluid passageways in said pump duct, said inlet and outlet including a transition means providing a transition from a round cross-sectional flow path to a substantially rectangular cross-sectional flow path and further including guide vanes located in said inlet transition means for directing a substantially equal flow of fluid to each of the passageways in said pump duct; and
   a body of thermal insulation located intermediate each of said stators and said pump duct.

2. The pump of claim 1 wherein said transition means diverges from a round cross-sectional flow path to a substantially rectangular cross-sectional flow path at an angle of less than about 10°.

3. The pump of claim 1 wherein said outlet transition means also includes guide vanes.

4. The pump of claim 1 wherein said pump duct is formed from a single piece of metal.

5. The pump of claim 1 further including a plurality of axially extending grooves located in said wall members on a surface opposite each of said web members.

6. The pump of claim 5 wherein said transition means diverges from a round cross-sectional flow path to a substantially rectangular cross-sectional flow path at an angle of less than about 10°.

7. The pump of claim 6 wherein said outlet transition means also includes guide vanes.

8. The pump of claim 7 wherein said pump duct is formed from a single piece of metal.

* * * * *